US012676543B2

(12) United States Patent
Wang

(10) Patent No.: US 12,676,543 B2
(45) Date of Patent: Jul. 7, 2026

(54) ZERO-SEQUENCE CURRENT SUPPRESSION METHOD AND DEVICE, CONVERTER AND WIND GENERATING SET

(71) Applicant: GOLDWIND SCIENCE & TECHNOLOGY CO., LTD., Urumqi (CN)

(72) Inventor: Jinpeng Wang, Beijing (CN)

(73) Assignee: GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 194 days.

(21) Appl. No.: 18/725,653

(22) PCT Filed: Jun. 29, 2022

(86) PCT No.: PCT/CN2022/102263
§ 371 (c)(1),
(2) Date: Jun. 28, 2024

(87) PCT Pub. No.: WO2023/123947
PCT Pub. Date: Jul. 6, 2023

(65) Prior Publication Data
US 2025/0070640 A1     Feb. 27, 2025

(30) Foreign Application Priority Data
Dec. 29, 2021     (CN) .......................... 202111632947.0

(51) Int. Cl.
*H02M 5/42*          (2006.01)
*H02M 1/00*          (2006.01)
(52) U.S. Cl.
CPC ............. *H02M 1/007* (2021.05); *H02M 5/42* (2013.01)
(58) Field of Classification Search
CPC ................................ H02M 1/007; H02M 5/42
See application file for complete search history.

(56) References Cited

U.S. PATENT DOCUMENTS 8,138,620 B2 *   3/2012   Wagoner ............... H02M 7/493
                                                      290/55
11,177,689 B2   11/2021   Ishida
                        (Continued)

FOREIGN PATENT DOCUMENTS

CN          103001521 A          3/2013
CN          103312187 A          9/2013
                        (Continued)

OTHER PUBLICATIONS

Wenchao Cao, et al; "Sequence Impedance Measurement of Three-Phase Inverters Using a Parallel Structure", Published in: 2015 IEEE Applied Power Electronics Conference and Exposition (APEC), 8 pages.

(Continued)

*Primary Examiner* — Adolf D Berhane

(57)          ABSTRACT

A zero-sequence current suppression method and device, a converter and a wind turbine are provided. The converter comprises N converter units connected in parallel, N being a positive integer greater than or equal to 2. The zero-sequence current suppression method comprises: obtaining a zero-sequence current in each of N−1 converter units among the N converter units; synchronizing pulse width modulation PWM control signals of all rectifiers in the N converter units and synchronizing PWM control signals of all inverters in the N converter units, to suppress high-frequency components of zero-sequence currents in the N converter units; and performing PI regulation by using the zero-sequence currents of the N−1 converter units and zero-sequence current reference values of the N−1 converter units, to suppress low frequency components of the zero-sequence currents in the N converter units.

15 Claims, 4 Drawing Sheets

(56)     References Cited

U.S. PATENT DOCUMENTS

| | | | |
|---|---|---|---|
| 2010/0314872 A1 | 12/2010 | Wagoner et al. | |
| 2013/0234641 A1* | 9/2013 | Li | H02P 27/08 |
| | | | 363/34 |
| 2017/0324361 A1 | 11/2017 | Zhang et al. | |
| 2021/0367534 A1 | 11/2021 | Hogan et al. | |

FOREIGN PATENT DOCUMENTS

| | | |
|---|---|---|
| CN | 105024578 A | 11/2015 |
| CN | 205863943 U | 1/2017 |
| CN | 108173296 A | 6/2018 |
| CN | 111327213 A | 6/2020 |
| CN | 112737388 A | 4/2021 |
| CN | 113193766 A | 7/2021 |
| CN | 114337223 A | 4/2022 |
| WO | 2017024596 A1 | 2/2017 |

OTHER PUBLICATIONS

Xueguang Zhang, et al; "A Coordinate Control Strategy for Circulating Current Suppression in Multiparalleled Three-Phase Inverters", IEEE Transactions on Industrial Electronics, vol. 64, No. 1, Jan. 2017, 10 pages.

Bassim M. H. Jassim, et al.; "Modular Current Sharing Control Scheme for Parallel-Connected Converters", IEEE Transactions on Industrial Electronics, vol. 62, No. 2, Feb. 2015, 11 pages.

The Extended European Search Report, dated Feb. 7, 2025; Appln. No. 22913236.0.

The First Chinese Office Action dated Feb. 22, 2024; Appln. No. 202111632947.0.

The International Search Report mailed Aug. 26, 2022; PCT/CN2022/102263.

* cited by examiner

First zero-sequence
circulation path

Second zero-sequence
circulation path

Third zero-sequence
circulation path

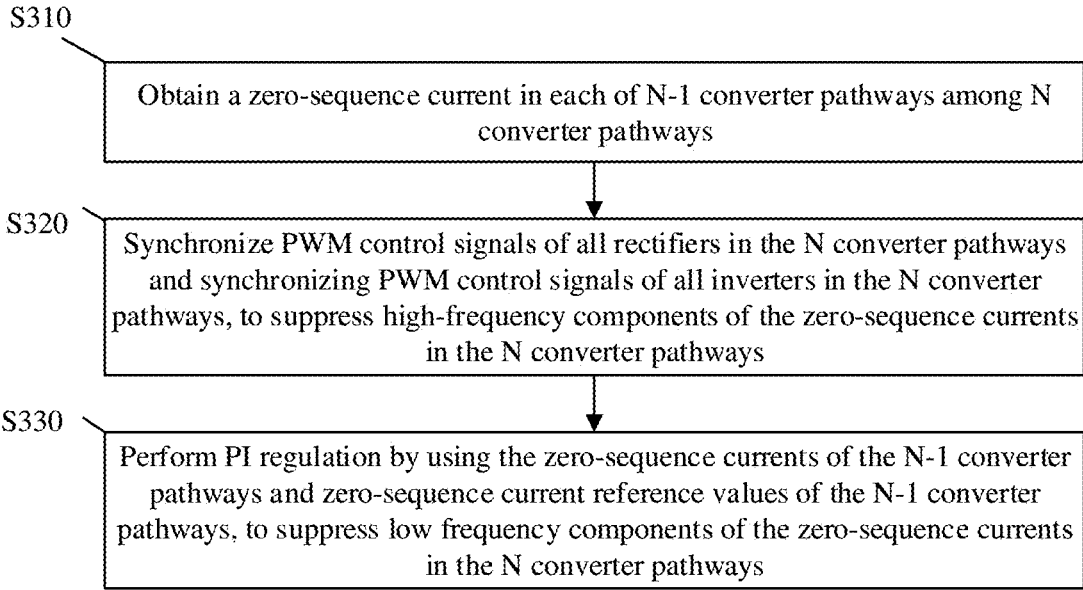

S310

Obtain a zero-sequence current in each of N-1 converter pathways among N converter pathways

S320

Synchronize PWM control signals of all rectifiers in the N converter pathways and synchronizing PWM control signals of all inverters in the N converter pathways, to suppress high-frequency components of the zero-sequence currents in the N converter pathways

S330

Perform PI regulation by using the zero-sequence currents of the N-1 converter pathways and zero-sequence current reference values of the N-1 converter pathways, to suppress low frequency components of the zero-sequence currents in the N converter pathways

Figure 3

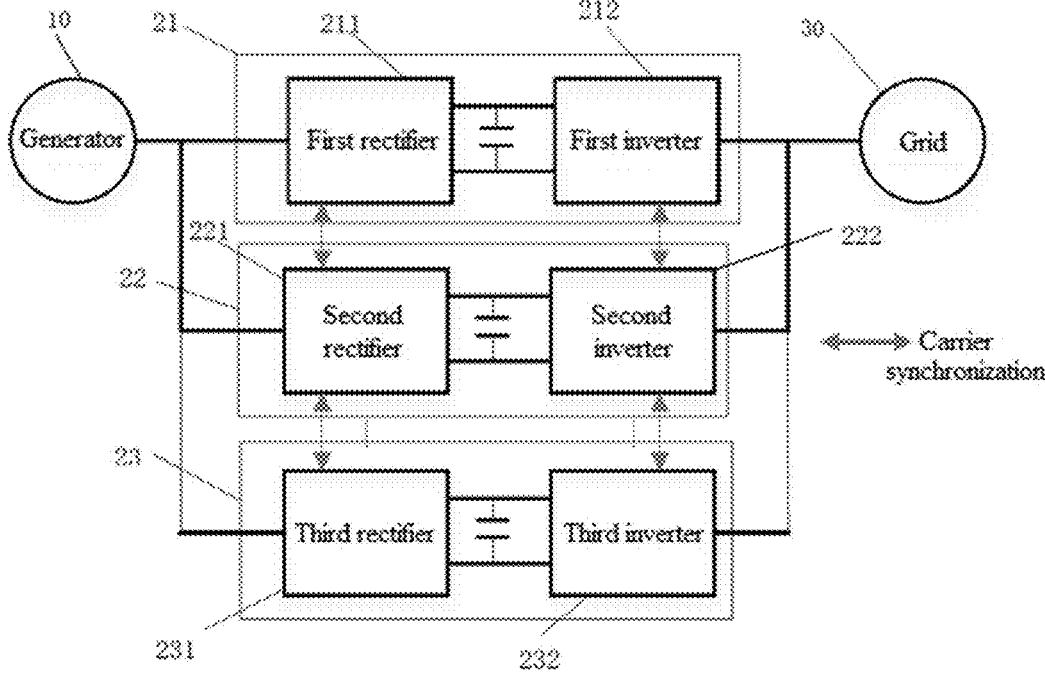

Figure 4

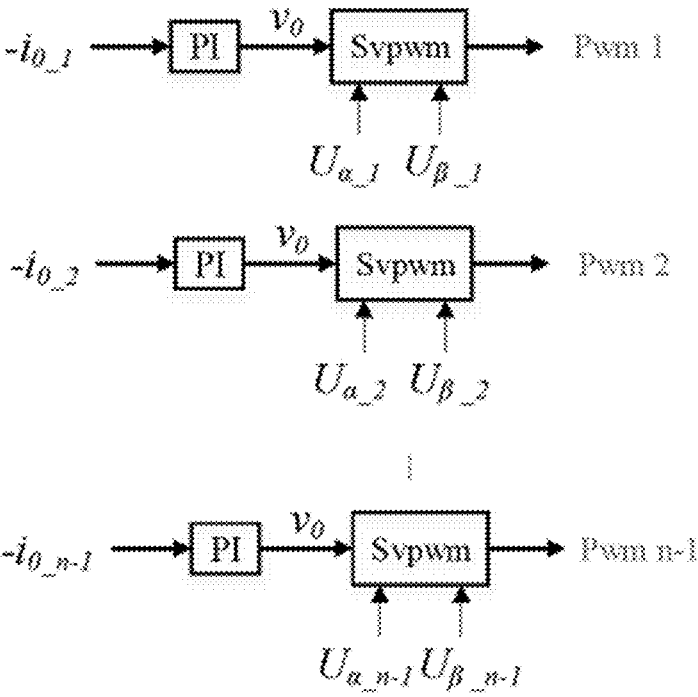

Figure 5

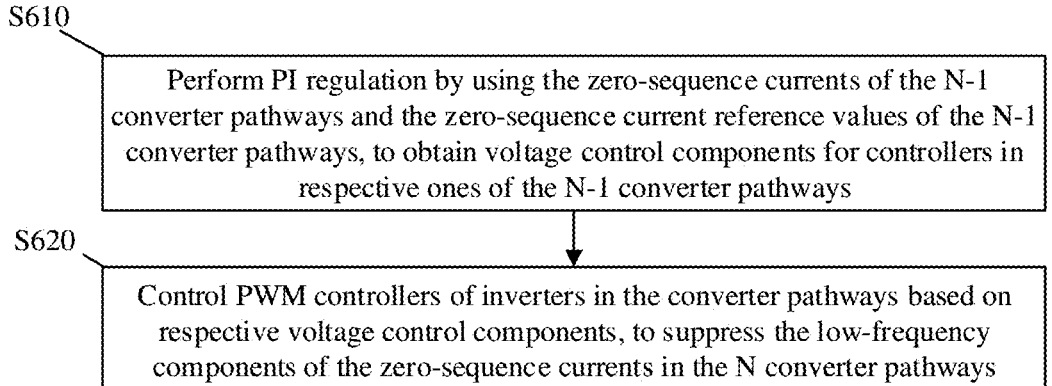

S610

| Perform PI regulation by using the zero-sequence currents of the N-1 converter pathways and the zero-sequence current reference values of the N-1 converter pathways, to obtain voltage control components for controllers in respective ones of the N-1 converter pathways |

S620

| Control PWM controllers of inverters in the converter pathways based on respective voltage control components, to suppress the low-frequency components of the zero-sequence currents in the N converter pathways |

Figure 6

ZERO-SEQUENCE CURRENT SUPPRESSION METHOD AND DEVICE, CONVERTER AND WIND GENERATING SET

This application is the national phase of International Patent Application No. PCT/CN2022/102263, filed Jun. 29, 2022, which claims priority to Chinese Patent Application No. 202111632947.0 titled "ZERO-SEQUENCE CURRENT SUPPRESSION METHOD AND DEVICE, CONVERTER, MEDIUM AND WIND GENERATING SET", filed on Dec. 29, 2021, the entireties of which are hereby incorporated herein by reference.

FIELD

The present disclosure generally relates to the field of converters, and in particular to a zero-sequence current suppression method and apparatus, a converter and a wind turbine.

BACKGROUND

The parallel connection of converter cabinets or converter units in a converter can increase the capacity of a converter system as well as improve conversion efficiency, and improve stability and reliability of the system.

However, due to the incomplete consistency of hardware parameters between the parallel-connected converter cabinets or converter units, the actions of switching devices in the converter cannot be completely synchronized, which may result in different output voltages of the converter units or converter cabinets. Hence, a zero-sequence voltage is generated. In addition, a structural difference, sampling, control parameter, fiber delay, and the like of modules in the converter may also cause inconsistency of the output voltages of the converter units or converter cabinets. A zero-sequence current, or zero-sequence circulation, is formed when the zero-sequence voltage acts on an equivalent resistance between wind power converters.

The zero-sequence circulating current increases deterioration of switching devices, reduces system efficiency, increase a probability of failure and shutdown of a wind power converter, and in severe cases may destroy the entire converter system. At present, there are no measures to effectively suppress the zero-sequence circulating current of the converter.

Conventionally, due to a capacity limitation, the parallel connection of the converter cabinets or converter units is not common for the wind power converter. With continues increase of overall power level of a wind turbine, a topology of parallel-connected converter cabinets becomes an application trend. However, the conventional technology for control of the wind power converter lacks a solution for suppressing the zero-sequence circulating current for the parallel connection.

In addition, for a solution that reduces a zero-sequence voltage difference by increasing a resistance, more resistors need to be added as the number of wind power converter cabinets or converter units increases, which also lead to an increased cost and loss.

The above content is presented only as background information for understanding relevant technical content. Disclosure of the above content does not mean that the above content pertains to prior art.

SUMMARY

An objective of the present disclosure is to provide a zero-sequence current suppression method and a zero-sequence current suppression apparatus, which are capable of zero-sequence current suppression.

Another objective of the present disclosure is to provide a zero-sequence current suppression method and a zero-sequence current suppression apparatus, which are capable of suppressing both a high-frequency component and a low-frequency component of a zero-sequence current.

According to a first aspect of the present disclosure, a zero-sequence current suppression method for a converter is provided. The converter includes N converter units connected in parallel, where N is a positive integer greater than or equal to 2. The zero-sequence current suppression method includes: obtaining a zero-sequence current in each of N−1 converter units among N converter units; synchronizing PWM control signals of all rectifiers in the N converter units and synchronizing PWM control signals of all inverters in the N converter units, to suppress high-frequency components of the zero-sequence currents in the N converter units; and performing PI regulation by using the zero-sequence currents of the N−1 converter units and zero-sequence current reference values of the N−1 converter units, to suppress low-frequency components of the zero-sequence currents in the N converter units.

According to a second aspect of the present disclosure, a computer-readable storage medium storing instructions or a program is provided. The zero-sequence current suppression method is implemented when a processor executes the instructions or the program.

According to a third aspect of the present disclosure, a zero-sequence current suppression apparatus for a converter is provided. The apparatus includes: a current sampling unit, configured to obtain a zero-sequence current in each of N−1 converter units among N converter units; a carrier synchronization unit, configured to synchronize PWM control signals of all rectifiers in the N converter units and synchronize PWM control signals of all inverters in the N converter units, to suppress high-frequency components of the zero-sequence currents in the N converter units; and a PI control unit, configured to perform PI regulation by using the zero-sequence currents of the N−1 converter units and zero-sequence current reference values of the N−1 converter units, to suppress low frequency components of the zero-sequence currents in the N converter units.

According to a fourth aspect of the present disclosure, a converter is provided. The converter includes the computer-readable storage medium as described above or the zero-sequence current suppression apparatus as described above.

According to a fifth aspect of the present disclosure, a wind turbine is provided, which includes the converter as described above.

The zero-sequence current suppression method for a converter and the zero-sequence current suppression apparatus according to the embodiments of the present disclosure can generate a zero-sequence compensation voltage and reduce costs.

The zero-sequence current suppression method for a converter and the zero-sequence current suppression apparatus according to the embodiments of the present disclosure can improve safety of a converter.

Some additional aspects and/or advantages of the general idea of the present disclosure are described in the following descriptions, and the other can be clear through the description, or can be known through implementation of the general idea of the present disclosure.

BRIEF DESCRIPTION OF THE DRAWINGS

The above and other objectives and features of the present disclosure will become more apparent from the following description in conjunction with the accompanying drawings illustrating exemplary embodiments of the present disclosure.

FIG. 3 is a flow chart of a zero-sequence current suppression method for a converter according to an embodiment of the present disclosure;

FIG. 4 is a control diagram for suppressing high-frequency components of zero-sequence currents according to an embodiment of the present disclosure:

FIG. 5 is a control diagram for suppressing low-frequency components of zero-sequence currents according to an embodiment of the present disclosure:

FIG. 6 is a flow chart of a zero-sequence current suppression method for a converter according to an embodiment of the present disclosure;

DETAILED DESCRIPTION

The zero-sequence current suppression method and the zero-sequence current suppression apparatus for a converter according to embodiments of the present disclosure is applicable to a converter (for example, a wind power converter) with multiple parallel-connected converter units or converter cabinets.

According to an embodiment of the present disclosure, in a case that the zero-sequence current suppression method and the zero-sequence current suppression apparatus for a converter are applied for suppressing a parallel zero-sequence current, a high-frequency component and a low-frequency component of the zero-sequence current are suppressed separately. The high-frequency component in the zero-sequence current is suppressed by carrier synchronization. The low-frequency component in the zero-sequence circulating current is suppressed by PI regulation.

A zero-sequence voltage output by a PI regulator is fed into a relevant controller, so as to suppress the low-frequency component of the zero-sequence current. Thereby, an amplitude of the parallel zero-sequence current is reduced to an acceptable range.

Reference will now be made in detail to the embodiments of the present disclosure. Examples of the embodiments are illustrated in the accompanying drawings. Throughout the drawings, same reference signs refer to same components. The embodiments are described below with reference to the accompanying drawings, in order to explain the present disclosure.

Figure 1:
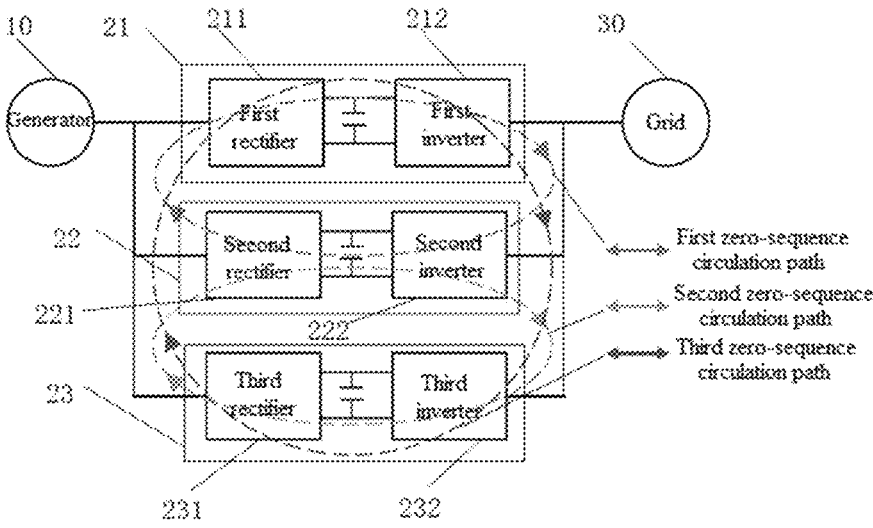
FIG. 1 and FIG. 2 are schematic diagrams showing a circulation path of a zero-sequence current.
Figure 2:
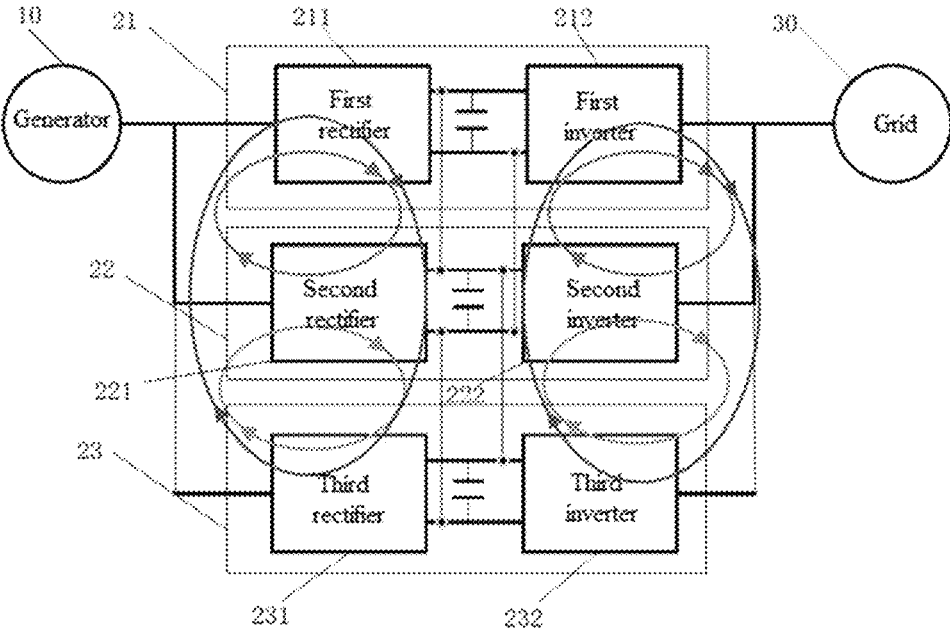

FIG. 1 and FIG. 2 are schematic diagrams showing a circulation path of a zero-sequence current.

According to an embodiment of the present disclosure, a converter may include multiple converter cabinets. Each of the converter cabinets may include one converter unit. The present disclosure is not limited thereto, and each converter cabinet may have multiple converter units. The multiple converter cabinets or converter units may be connected in parallel to each other.

As shown in FIG. 1 and FIG. 2, as an example, the wind power converter may include a first converter cabinet 21, a second converter cabinet 22 and a third converter cabinet 23. The first converter cabinet 21, the second converter cabinet 23 and the third converter cabinet 23 may be disposed between a generator side 10 and a grid side 30. Each of the first converter cabinet 21, the second converter cabinet 22 and the third converter cabinet 23 may accommodate one converter unit.

Although FIG. 1 and FIG. 2 show that the wind power converter has three converter cabinets, the present disclosure is not limited thereto. The wind power converter may include two converter cabinets, four converter cabinets or more converter cabinets. Each converter cabinet may include one converter unit.

Each converter unit may include a rectifier and an inverter. Each converter unit may include one rectifier and one inverter. Each switching element of the rectifier and the inverter may be implemented by an insulated-gate bipolar transistor (IGBT).

As shown in FIG. 1 and FIG. 2, the first converter cabinet 21 may include a first rectifier 211 and a first inverter 212, the second converter cabinet 22 may include a second rectifier 221 and a second inverter 222, and the third converter cabinet 23 may include a third rectifier 231 and a third inverter 232.

The first converter cabinet 21, the second converter cabinet 22 and the third converter cabinet 23 are connected in parallel.

As shown in FIG. 1, a zero-sequence current is generated in each of the converter units in a case that a zero-sequence voltage is generated between the first converter cabinet 21 and the second converter cabinet 22, between the second converter cabinet 22 and the third converter cabinet 23, and between the first converter cabinet 21 and the third converter cabinet 23. A path of the zero-sequence current or zero-sequence circulation is as shown in FIG. 1. A first zero-sequence circulation path is generated between the first converter cabinet 21 and the second converter cabinet 22, a second zero-sequence circulation path is generated between the second converter cabinet 22 and the third converter cabinet 23, and a third zero-sequence circulation path is generated between the first converter cabinet 21 and the third converter cabinet 23.

As shown in FIG. 2, support capacitors on the converter units are connected in a common bus. FIG. 2 shows more zero-sequence circulation paths than FIG. 1, but have fewer elements on the zero-sequence circulation paths than FIG. 1. A strategy for suppressing and controlling the zero-sequence circulations shown in FIG. 2 is more complex than that for FIG. 1.

In an embodiment of the present disclosure, the zero-sequence current suppression method and the zero-sequence current suppression apparatus are particularly suitable for parallel current suppression of non-common bus (zero-sequence current suppression shown in FIG. 1). Although not shown, each rectifier and each inverter may include a corresponding pulse width modulation (PWM) controller.

FIG. 3 is a flow chart of a zero-sequence current suppression method for a converter according to an embodiment of the present disclosure. FIG. 4 is a control diagram for suppressing high-frequency components of zero-sequence currents according to an embodiment of the present disclosure. FIG. 5 is a control diagram for suppressing low-frequency components of zero-sequence currents according to an embodiment of the present disclosure. FIG. 6 is a flow chart of a zero-sequence current suppression method for a converter according to an embodiment of the present disclosure.

According to an embodiment of the present disclosure, the zero-sequence current suppression method for a converter may include steps S310, S320 and S330.

In step S310, a zero-sequence current in each of N−1 converter units among N converter units which are parallel-connected in the converter is obtained, where N may be a positive integer greater than or equal to 2. For example, N may be 3. In a case that the zero-sequence currents in the N−1 converter units are controlled to 0, a zero-sequence circulation through the N-th converter unit is naturally 0. Therefore, for suppression of low-frequency components of the zero-sequence currents, it is adequate to measure and control only the zero-sequence currents in the N−1 converter units.

As an example, a three-phase current on an AC side of a rectifier in each converter unit among the N−1 converter units may be obtained separately, and then the zero-sequence current in the converter unit may be calculated or determined based on the three-phase current.

In addition, the zero-sequence current of the N−1 converter units may be calculated separately by using an input current of a rectifier of the corresponding converter unit, or may be calculated separately by using an output current of an inverter of the corresponding converter unit. The DC buses in each of the N converter units are independent from each other.

In step S320, PWM control signals of all rectifiers in the N converter units are synchronized and PWM control signals of all inverters in the N converter units are synchronized, to suppress high-frequency components of the zero-sequence currents in the N converter units.

For example, PWM control signals of all rectifiers in three converter units are synchronized and PWM control signals of all inverters in the three converter units are synchronized, so that a high-frequency component of the zero-sequence current in each of the three converter units is suppressed.

A PWM controller of the rectifier of an arbitrarily selected converter unit (for example, an i-th converter unit, where i≤N) and a PWM controller of the inverter of the converter unit (the i-th converter unit) may be determined. A PWM control signal of the determined rectifier is loaded into PWM controllers of the other N−1 rectifiers by clock synchronization. A PWM control signal of the determined inverter is loaded into PWM controllers of the other N−1 inverters by clock synchronization.

For example, a PWM controller of the first rectifier 211 and a PWM controller of the first inverter 212 may be selected. A PWM control signal of the PWM controller of the first rectifier 211 is loaded into a PWM controller of the second rectifier 221 and a PWM controller of the third rectifier 231 by clock synchronization. A PWM control signal of the PWM controller of the first inverter 212 is loaded into a PWM controller of the second inverter 222 and a PWM controller of the third inverter 232 by clock synchronization.

In the N converter units, PWM controllers of rectifiers in adjacent ones of the converter units may communicate with each other through optical fiber connection, and PWM controllers of inverters in adjacent ones of the converter units may communicate with each other through optical fiber connection. In other words, the PWM controllers of all rectifiers in the N converter units (for example, the PWM controller of the first rectifier to the PWM controller of the N-th rectifier) may be networked through optical fibers, and the PWM controllers of all inverters in the N converter units (for example, the PWM controller of the first inverter to the PWM controller of the N-th inverter) may be networked through optical fibers.

In step S330, proportional-integral (PI) regulation is performed by using the zero-sequence currents of the N−1 converter units and zero-sequence current reference values of the N−1 converter units, to suppress low frequency components of the zero-sequence currents in the N converter units.

For each of the zero-sequence currents in the N−1 converter units, a difference between the zero-sequence current and zero-sequence current reference value (which may be 0V, for example) may be inputted to a PI regulator to obtain a control voltage component. Then, the control voltage component may be loaded to a space vector pulse width modulation (SVPWM) unit. The SVPWM unit outputs, in response to the control voltage component, a control signal for controlling an IGBT of the inverter in the converter unit. Thereby, the low-frequency component of the zero-sequence current in the converter unit is suppressed.

Reference is made to FIG. 6. A process of performing PI regulation by using the zero-sequence currents of the N−1 converter units and zero-sequence current reference values of the N−1 converter units, to suppress low frequency components of the zero-sequence currents in the N converter units includes step S610 and step S620.

In step S610, PI regulation is performed by using the zero-sequence currents of the N−1 converter units and zero-sequence current reference values of the N−1 converter units, to obtain voltage control components for controllers in respective ones of the N−1 converter units.

In step S620, PWM controllers of inverters in the respective converter units are controlled based on the voltage control components, to suppress the low-frequency components of the zero-sequence currents in the N converter units.

Reference is made to FIG. 5. A difference between a zero-sequence current $-i_{0\_1}$ of a first converter unit and a zero-sequence current reference value (0V, for example) of the first converter unit (that is, the difference is equal to the zero-sequence current $-i_{0\_1}$) may be input to the PI regulator. The PI regulator may output a control voltage component $V_0$. The control voltage component $V0$ may be loaded together with other voltage control components $U_{\alpha\_1}$ and $U_{\beta\_i}$ to the space vector pulse width modulation (SVPWM) unit. The SVPWM unit may output a PWM control signal PWM1 to a switching element of the inverter in the first converter unit. A coefficient of a proportional part and a coefficient of an integral part of the PI regulator may have constant values which may be empirical.

Similarly, a difference between a zero-sequence current $-i_{0\_2}$ of a second converter unit and a zero-sequence current reference value (0V, for example) of the second converter unit (that is, the difference is equal to the zero-sequence current $-i_{0\_2}$) may be input to the PI regulator. The PI regulator may output a control voltage component $V_0$. The control voltage component $V_0$ may be loaded together with other voltage control components $U_{\alpha\_2}$ and $U_{\beta\_2}$ to the space vector pulse width modulation (SVPWM) unit. The SVPWM unit may output a PWM control signal PWM2 to a switching element of the inverter in the second converter unit. A difference between a zero-sequence current $-i_{0\_n-1}$ of an (N−1)-th converter unit and the zero-sequence current reference value (0V, for example) of the (N−1)-th converter unit (that is, the difference is equal to the zero-sequence current $-i_{0\_n-1}$) may be input to the PI regulator. The PI regulator may output a control voltage component $V_0$. The control voltage component $V_0$ may be loaded together with other voltage control components $U_{\alpha\_n-1}$ and $U_{\beta\_n-1}$ to the space vector pulse width modulation (SVPWM) unit. The SVPWM unit may output a PWM control signal PWMn−1 to the switching elements of the inverter in the (N−1)-th converter unit.

It should be noted that a coefficient of a proportional part and a coefficient of an integral part of each PI regulator may have constant values which may both be empirical values. The control voltage components $V_0$ output by different PI regulators may be different. The $U_{\alpha\_1}$ to $U_{\alpha\_n-1}$ and $U_{\beta\_1}$ to $U_{\beta\_n-1}$ are control voltages generated under another control strategy. The control strategy is not specifically limited, and the number of control voltages under the control strategy is not limited.

In addition, when n=2, a three-phase current on an AC side of a rectifier of a first converter unit may be obtained, and the zero-sequence current in the first converter unit may be calculated or determined based on the three-phase current.

The PWM control signals of all rectifiers on the first converter unit and the second converter unit are synchronized and PWM control signals of all inverters are synchronized, so that high-frequency components of the zero-sequence currents in the two converter units are suppressed.

Since the zero-sequence current in the first converter unit is the same as the zero-sequence current in the second converter unit, the PWM controller of the second converter unit may be controlled based on the zero-sequence current in the first converter unit.

In addition, step S310, step S320 and step S330 may not be limited to be performed in the listed sequence. The step of synchronizing high-frequency carriers may be performed first, and then the steps of measuring the zero-sequence currents and suppressing the low-frequency zero-sequence currents may be performed. Alternatively, the step of synchronizing the high-frequency carriers may be performed last.

Figure 7:
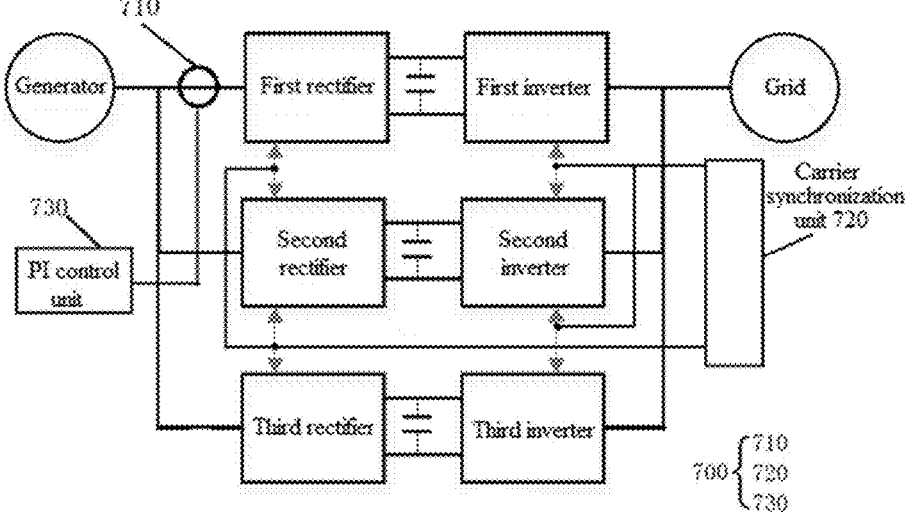
FIG. 7 is a block diagram of a zero-sequence current suppression apparatus for a converter according to an embodiment of the present disclosure.

FIG. 7 is a block diagram of a zero-sequence current suppression apparatus for a converter according to an embodiment of the present disclosure.

According to an embodiment of the present disclosure, a zero-sequence current suppression apparatus 700 for a converter may include a current sampling unit 710, a carrier synchronization unit 720 and a PI control unit 730.

The current sampling unit 710 may be configured to obtain the zero-sequence current of N−1 converter units in N converter units. The current sampling unit 710 may be disposed at an input port of the rectifier of each converter unit, or may be disposed at an output port of the inverter of each converter unit. FIG. 7 only shows an example in which the current sampling unit 710 is disposed at an input port of a certain converter unit. Specific implementation thereof may be determined based on an actual situation and is not limited thereto.

Generally, the current sampling unit 710 may include multiple sensors disposed at the input ports of the rectifiers or the output ports of the inverters of the converter units.

The carrier synchronization unit 720 may be configured to synchronize PWM control signals of all rectifiers in the N converter units and synchronize PWM control signals of all inverters in the N converter units, to suppress high-frequency components of the zero-sequence currents in the N converter units.

The carrier synchronization unit 720 may include PWM controllers for synchronizing the PWM control signals of each rectifiers. The signals of the PWM controllers may be synchronized through a clock signal. For example, a PWM control signal of a certain PWM controller may be loaded to another PWM controller through clock synchronization. Communication between the PWM controllers may be achieved through an optical fiber.

The PI control unit 730 is configured to perform PI regulation by using the zero-sequence currents of the N−1 converter units and zero-sequence current reference values of the N−1 converter units, to suppress low frequency components of the zero-sequence currents in the N converter units.

The PI control unit 730 may input a difference between each of the zero-sequence currents of the N−1 converter units and zero-sequence current reference values (0V, for example) of the N−1 converter units to a PI regulator. The PI regulator may output a control voltage component.

The control voltage component outputted from the PI control unit 730 may be loaded to a space vector pulse width modulation (SVPWM) unit. The SVPWM unit outputs, in response to the control voltage component, a control signal for controlling an IGBT of the inverter in the corresponding converter unit. Thereby, the low-frequency component of the zero-sequence current on the converter unit is suppressed.

For example, the PI control unit 730 may perform the PI regulation by using the zero-sequence currents of the N−1 converter units and zero-sequence current reference values of the N−1 converter units, to obtain voltage control components for controllers in respective ones of the N−1 converter units; and control, based on the voltage control components, PWM controllers of the inverters in the respective converter units, to suppress the low-frequency components of the zero-sequence currents in the N converter units.

The PI control unit 730 may include multiple PI regulators, and the number of the PI regulators may correspond to the number of inverters.

In FIG. 7, components other than the current sampling unit 710, the carrier synchronization unit 720 and the PI control unit 730 may be the same as components as shown in FIG. 4, which are not repeated here.

It should be understood that units or modules in the zero-sequence current suppression apparatus for a converter according to the exemplary embodiments of the present disclosure may be implemented as hardware components and/or software components. Those skilled in the art may, for example, utilize a field programmable gate array (FPGA), an application specific integrated circuit (ASIC), a software algorithm, and the like, to implement the unit based on defined processing performed by the units.

According to an embodiment of the present disclosure, the apparatus (such as modules or functions thereof) or method may be implemented by programs or instructions stored in a computer-readable storage medium. In a case that the instructions are executed by a processor, the processor may perform a function corresponding to the instructions or perform a method corresponding to the instructions. At least a part of the modules may be implemented (for example, executed) by a processor. At least a part of programming modules may include modules, programs, routines, sets of instructions, and processes for performing at least one function. In an example, instructions or software include machine codes (such as machine codes generated by a compiler) executed directly by one or more processors or computers. In another example, instructions or software include higher-level codes executed in one or more processors or computers by using an interpreter. The instructions or software may be written by using any programming language based on the block diagram and flow chart illustrated in the drawings and corresponding descriptions in the specification.

A module or programming module in the present disclosure may include at least one of the aforementioned components with some components omitted or other components added. Operations of the modules, programming modules, or other components may be performed sequentially, in parallel, in a loop, or heuristically. Additionally, some operations may be performed in a different order, omitted, or extended with other operations.

The operations of the steps may be written as a software program or instruction. Therefore, the zero-sequence current suppression method according to the exemplary embodiments of the present disclosure may be implemented via software. The computer-readable storage medium according to the exemplary embodiments of the present disclosure may store a computer program. The computer program, when executed by a processor, performs the zero-sequence current suppression method for a wind power converter as described in any of the exemplary embodiments.

Examples of computer-readable storage media may include a magnetic media such as a floppy disk and a magnetic tape, an optical medium (including a compact disk (CD) ROM and DVD ROM), a magneto-optical medium such as a floppy optical disk, and a medium designed for storing and executing program commands such as hardware devices of ROM, RAM and a flash memory. The program instructions include language code executable by a computer using an interpreter and machine language code produced by a compiler. The above-described hardware apparatus may be implemented by one or more software modules for performing operations of embodiments of the present disclosure.

The wind power converter according to the embodiments of the present disclosure may include the computer-readable storage medium as described above or the zero-sequence current suppression apparatus as described above.

The computer-readable storage medium, the zero-sequence current suppression apparatus and/or the wind power converter as described above may be part of a wind turbine.

The computer-readable storage medium and/or the zero-sequence current suppression apparatus according to the exemplary embodiments of the present disclosure may be part of a PWM controller or control system.

Figure 8:
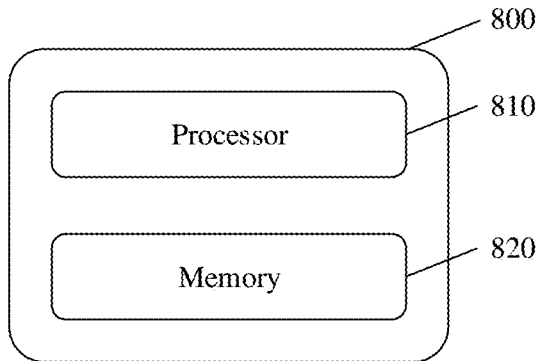
FIG. 8 is a block diagram of a controller in a converter according to an embodiment of the present disclosure.

FIG. 8 is a block diagram of a controller of a converter according to an embodiment of the present disclosure.

As shown in FIG. 8, a controller 800 of the converter according to an exemplary embodiment of the present disclosure includes a processor 810 and a memory 820. The memory 820 stores a computer program. The computer program, when executed by the processor 810, performs the zero-sequence current suppression method for a wind power converter according to the above exemplary embodiments.

The zero-sequence current suppression method for a converter and the zero-sequence current suppression apparatus according to the embodiment of the present disclosure are capable of zero-sequence current suppression.

The zero-sequence current suppression method for a converter and the zero-sequence current suppression apparatus according to the embodiment of the present disclosure are capable of suppressing both a high-frequency component of a zero-sequence current and a low-frequency of the zero-sequence current.

The zero-sequence current suppression method for a converter and the zero-sequence current suppression apparatus according to the embodiments of the present disclosure can generate a zero-sequence compensation voltage and reduce costs.

The zero-sequence current suppression method for a converter and the zero-sequence current suppression apparatus according to the embodiments of the present disclosure can improve safety of a wind power converter.

Although some exemplary embodiments of the present disclosure are shown and described, those skilled in the art should understand that modifications can be made to the embodiments without departing from the principle and spirit of the present disclosure whose scope is defined by the claims and equivalents thereof. For example, technical features of different embodiments may be combined with each other. Embodiments obtained by combining technical features in different embodiments should be regarded as part of the present disclosure.

The invention claimed is:

1. A zero-sequence current suppression method for a converter, wherein the converter comprises N converter units connected in parallel, where N is a positive integer greater than or equal to 2, and the method comprises:
    obtaining a zero-sequence current in each of N−1 converter units among the N converter units;
    synchronizing pulse width modulation PWM control signals of all rectifiers in the N converter units and synchronizing PWM control signals of all inverters in the N converter units, to suppress high-frequency components of zero-sequence currents in the N converter units; and
    performing PI regulation by using the zero-sequence currents of the N−1 converter units and zero-sequence current reference values of the N−1 converter units, to suppress low frequency components of the zero-sequence currents in the N converter units.

2. The zero-sequence current suppression method of the converter according to claim 1, wherein the performing PI regulation by using the zero-sequence currents of the N−1 converter units and zero-sequence current reference values of the N−1 converter units, to suppress low frequency components of the zero-sequence currents in the N converter units comprises:
    performing the PI regulation by using the zero-sequence currents of the N−1 converter units and zero-sequence current reference values of the N−1 converter units, to obtain voltage control components for controllers in respective ones of the N−1 converter units; and
    controlling, based on the voltage control components, PWM controllers of the inverters in the respective converter units, to suppress the low-frequency components of the zero-sequence currents in the N converter units.

3. The zero-sequence current suppression method of the converter according to claim 1, wherein DC buses in each of the N converter units are independent from each other.

4. The zero-sequence current suppression method of the converter according to claim 1, wherein for each of the N−1 converter units, the zero-sequence current is obtained by calculating from an input current of a rectifier of the converter unit.

5. The zero-sequence current suppression method of the converter according to claim 1, wherein
    among the N converter units,
        PWM controllers of rectifiers in adjacent ones of the converter units communicate with each other through optical fiber connection, and
        PWM controllers of inverters in adjacent ones of the converter units communicate with each other through optical fiber connection.

6. The zero-sequence current suppression method of the converter according to claim 5, wherein PWM control signals of all rectifiers in the N converter units are synchronized through clock synchronization and, PWM control signals of all inverters in the N converter units are synchronized through clock synchronization.

7. A non-transitory computer-readable storage medium, wherein the computer-readable storage medium stores instructions or programs, and implements the following steps when the instructions or programs are executed by a processor:

obtaining a zero-sequence current in each of N−1 converter units among the N converter units;

synchronizing pulse width modulation PWM control signals of all rectifiers in the N converter units and synchronizing PWM control signals of all inverters in the N converter units, to suppress high-frequency components of zero-sequence currents in the N converter units; and performing PI regulation by using the zero-sequence currents of the N−1 converter units and zero-sequence current reference values of the N−1 converter units, to suppress low frequency components of the zero-sequence currents in the N converter units.

8. A zero-sequence current suppression apparatus, comprising:

a processor; and a memory storing a computer program, wherein the processor, when executing the computer program, is configured to:

obtain a zero-sequence current in each of N−1 converter units among N converter units connected in parallel in a converter;

synchronize PWM control signals of all rectifiers in the N converter units and synchronize PWM control signals of all inverters in the N converter units, to suppress high-frequency components of the zero-sequence currents in the N converter units; and perform PI regulation by using the zero-sequence currents of the N−1 converter units and zero-sequence current reference values of the N−1 converter units, to suppress low frequency components of the zero-sequence currents in the N converter units.

9. A converter, comprising the zero-sequence current suppression apparatus according to claim 8.

10. A wind turbine, comprising the converter according to claim 9.

11. The zero-sequence current suppression apparatus according to claim 8, wherein the processor is further configured to:

perform the PI regulation by using the zero-sequence currents of the N−1 converter units and zero-sequence current reference values of the N−1 converter units, to obtain voltage control components for controllers in respective ones of the N−1 converter units; and control, based on the voltage control components, PWM controllers of the inverters in the respective converter units, to suppress the low-frequency components of the zero-sequence currents in the N converter units.

12. The zero-sequence current suppression apparatus according to claim 8, wherein DC buses in each of the N converter units are independent from each other.

13. The zero-sequence current suppression apparatus according to claim 8, wherein for each of the N−1 converter units, the zero-sequence current is obtained by calculating from an input current of a rectifier of the converter unit.

14. The zero-sequence current suppression apparatus according to claim 8, wherein among the N converter units, PWM controllers of rectifiers in adjacent ones of the converter units communicate with each other through optical fiber connection, and PWM controllers of inverters in adjacent ones of the converter units communicate with each other through optical fiber connection.

15. The zero-sequence current suppression apparatus according to claim 14, wherein PWM control signals of all rectifiers in the N converter units are synchronized through clock synchronization and, PWM control signals of all inverters in the N converter units are synchronized through clock synchronization.

* * * * *